United States Patent
Bleier, Jr. et al.

(10) Patent No.: US 6,832,184 B1
(45) Date of Patent: Dec. 14, 2004

(54) INTELLIGENT WORK STATION SIMULATION—GENERALIZED LAN FRAME GENERATION SIMULATION STRUCTURE

(75) Inventors: William H. Bleier, Jr., Poughkeepsie, NY (US); Dale E. Blue, Poughkeepsie, NY (US); Kevin J. Brady, Port Ewen, NY (US); Jeff R. Jones, Fishkill, NY (US); Max M. Maurer, Gardiner, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/517,534

(22) Filed: Mar. 2, 2000

(51) Int. Cl.[7] .......................... G06F 17/50; G06F 9/455
(52) U.S. Cl. ..................... 703/23; 703/13; 702/182; 702/186; 709/223
(58) Field of Search ................. 702/186, 182, 702/183, 185, 187; 703/13, 23, 21, 22, 20, 24, 26, 27; 709/223, 222, 224, 220, 221; 714/38, 4, 32, 33, 37, 39, 47

(56) References Cited

U.S. PATENT DOCUMENTS

| | | | |
|---|---|---|---|
| 5,379,296 A | | 1/1995 | Johnson et al. |
| 5,394,540 A | * | 2/1995 | Barrington et al. ........... 703/21 |
| 5,440,719 A | * | 8/1995 | Hanes et al. .................. 703/21 |
| 5,621,726 A | * | 4/1997 | Murakimi .................... 370/255 |
| 5,640,537 A | * | 6/1997 | Jessen et al. ................. 703/23 |
| 5,669,000 A | * | 9/1997 | Jessen et al. ............... 717/127 |
| 5,680,585 A | * | 10/1997 | Bruell ......................... 703/26 |
| 5,732,213 A | * | 3/1998 | Gessel et al. ............... 709/224 |
| 5,748,617 A | * | 5/1998 | McLain ...................... 370/244 |
| 5,774,695 A | * | 6/1998 | Autrey et al. ................. 703/26 |
| 5,781,720 A | * | 7/1998 | Parker et al. ................ 714/38 |
| 5,812,780 A | * | 9/1998 | Chen et al. ................. 709/224 |
| 5,819,066 A | * | 10/1998 | Bromberg et al. .......... 707/102 |
| 5,838,919 A | | 11/1998 | Schwaller et al. |
| 5,862,362 A | * | 1/1999 | Somasegar et al. ........... 703/21 |
| 5,881,237 A | | 3/1999 | Schwaller et al. |
| 5,881,269 A | | 3/1999 | Dobbelstein |
| 5,889,954 A | * | 3/1999 | Gessel et al. ................. 703/23 |
| 5,946,474 A | * | 8/1999 | Skogby ........................ 703/13 |
| 5,954,829 A | * | 9/1999 | McLain et al. ............. 714/712 |
| 6,002,871 A | * | 12/1999 | Duggan et al. ............. 717/135 |
| 6,134,690 A | * | 10/2000 | Ivaturi et al. ............... 714/736 |
| 6,167,534 A | * | 12/2000 | Straathof et al. ............. 714/38 |
| 6,233,619 B1 | * | 5/2001 | Narisi et al. ................ 709/230 |
| 6,243,832 B1 | * | 6/2001 | Eckes et al. .................. 714/33 |
| 6,269,330 B1 | * | 7/2001 | Cidon et al. .................. 714/43 |
| 6,304,982 B1 | * | 10/2001 | Mongan et al. .............. 714/38 |
| 6,314,531 B1 | * | 11/2001 | Kram .......................... 714/38 |
| 6,393,386 B1 | * | 5/2002 | Zager et al. ................. 703/25 |
| 6,549,882 B1 | * | 4/2003 | Chen et al. .................. 703/21 |

FOREIGN PATENT DOCUMENTS

| WO | WO 97/35406 | * | 9/1997 | ................ 709/223 |
|---|---|---|---|---|

* cited by examiner

Primary Examiner—W. D. Thomson
(74) Attorney, Agent, or Firm—Scully, Scott, Murphy & Presser; William A. Kinnaman, Jr.

(57) ABSTRACT

A simulator of intelligent workstations at level 2 the OSI model for generating complete LAN frames for testing a system under test. The simulator includes a scripting facility that represents the actions of the human end-user at the client workstation. By providing a scripting facility, different complexions of a workload can be impressed upon the system under test without the need for human end-users nor the need for rebuilding the simulation tool. The simulator includes embedded protocol stacks allowing manipulation of the simulated LAN frames. The simulator also includes one or more embedded protocol application modules for emulating actions of an application, e.g., web browser, and enabling the handling of dynamic, application-related events. In the present invention, one or more application programming interfaces (APIs) are provided between the simulation tool and the PAM and between the PAM and the protocol stack to allow multiple applications to be concurrently simulated and to provide extensibility of the simulation tool by providing the ability to support new applications and protocol stacks.

26 Claims, 7 Drawing Sheets

TCP/IP PACKET ELEMENTS

INTELLIGENT WORK STATION SIMULATION— GENERALIZED LAN FRAME GENERATION SIMULATION STRUCTURE

CROSS-REFERENCE TO RELATED APPLICATIONS

This application is related to U.S. patent application Ser. No. 09/516,708, entitled "INTELLIGENT WORKSTATION SIMULATION-STIMULATION AT PROTOCOL STACK LEVEL 2" filed on Mar. 2, 2000, and U.S. Patent Application Ser. No. 09/517,465, entitled "INTELLIGENT WORKSTATION SIMULATION-CLIENT VIRTUALIZATION", filed on Mar. 2, 2000, both of which are incorporated herein in their entirety by reference thereto.

TECHNICAL FIELD OF THE INVENTION

The present invention relates generally to a simulation method and system for testing computer networks, and more particularly to a method and system for generating local area network ("LAN") traffic for multiple simulated client workstations.

BACKGROUND OF THE INVENTION

Computers and computer networks currently provide important advantages to enterprises and individuals in today's society. Moreover, with the advent and ensuing popularity of the Internet and the World Wide Web ("Web"), there is a tremendous increase in volume and usage of networked computer systems. Consequently, the explosive growth of computer networks has necessitated a need for larger servers to handle the network traffic. Presently, different implementation paradigms are available for handling this increase in volume. For example, some developers in the computer industry are implementing larger single servers to handle the network traffic while others are including a greater number of duplicated, relatively small servers to handle the increase in the network traffic volume.

Typically, as part of a development cycle, computer systems and software applications are tested by utilizing a simulation test tool, designed to emulate a real run-time environment in order to test whether the specific computer system or application meets the various design criteria. In both of the above-described server implementations for meeting the high demand of network e) traffic, a complete and thorough test requires that the servicing computer, e.g., a server comprising a single machine or multiple machines, be tested at full load. Failure to execute a complete test inevitably results in a failure in the system when a full load is eventually impressed upon the server during the run-time. Accordingly, to effectively test large and complex distributed applications and/or server applications, simulation of a realistically large client base is needed. Currently existing simulation tools provide simulation at application level. However, simulation at the application level yields an application specific simulator. Simulation at the port level is an improvement but still fails to exercise many client-specific paths in the system under test. Thus, a general purpose simulator that seeks to provide a high fidelity simulation, for example, a simulation at level 2, the data link layer of the protocol stack, is highly desirable. The data link layer is the lowest protocol stack level where each individual client has a unique client address.

Other simulators are currently available for testing computer networks to withstand a large volume of traffic. FIG. 1 is a diagram 100 illustrating a typical prior art simulation setup. The serving system, i.e., a system under test 102 is driven by a set of simulation driving systems, S 104. These driving systems 104 are controlled by a central machine, simulation controller 106. All of these machines share a common connection medium 108 such as a local area network or LAN. A plurality of such configurations may be present in order to achieve the total bandwidth necessary to drive the serving system. There may be multiple controlling systems or the controlling system may have connections to multiple LANs.

Typically, the existing prior art simulators fall into two broad categories: 1) keystroke stuffers; and 2) protocol exercisers. A "keystroke stuffer" utilizes the actual application on the driving client. The driving vehicle is a program which retrieves stored scripts of keystrokes, mouse movements, and/or other user inputs to provide input to the actual client application to drive the application. The application then directs the traffic through a client protocol stack to the system under test 102.

FIG. 2 is a diagram of the seven layer Open Systems Interconnection ("OSI") protocol stack model. Each of the layers represents a function that must be performed to effect communication between different machines. The lowest layer in the model is the physical layer 202. The functions within the physical layer 202 include setting up, maintaining, and deactivating physical circuits U) between systems. The most notable physical layer interfaces include IEEE 802.2 and IEEE 802.3. The next layer, i.e., layer 2, in the OSI model is the data link layer 204, which is responsible for transferring data over the physical circuits or the channel between systems. The functions of the data link layer 204 include dividing data into frames in order to transfer the frames to another system across the physical medium. The data link layer provides for the synchronization of data to delimit the flow of bits from the physical layer. The data link is a point-to-point link between two devices that are directly connected together.

The next layer, layer 3, is the network layer 206. The network layer 206 provides inter-network services such as the network routing and the communications between networks. The network layer 206 handles multiple point-to-point links in the case where frames are transmitted across multiple links to reach their destination. Internet Protocol ("IP") in the Transmission Control Protocol/Internet Protocol ("TCP/IP") suite is a network layer protocol.

The next layer, layer 4, is the transport layer 208. The transport layer 208 provides end-to-end accountability of data transmitted as streams of packets. The transport layer functions include monitoring data flow to ensure proper delivery of data between source and destination. It provides for error correction and for data fragmentation and reassembly. TCP is a protocol layer protocol.

The next layer up, layer 5, is the session layer 210. The session layer 210 provides for control and synchronization in exchanging data between users. For example, dialogues may be used for check and recovery of data transfer. The next layer up, layer 6, is the presentation layer 212. The presentation layer 212 functions include formatting data for display or presentation. In this layer, codes and encryption in data are interpreted and formatted for presentation. The next layer up, layer 7, is the application layer 214. This layer is responsible for supporting end-user applications such as file transfer, electronic message exchanges and terminal session.

Importantly, it should be understood that all layers of the above-described OSI model are not necessarily present in all protocol stacks. That is, the OSI protocol stack is a reference model to provide standardized logical decomposition of network into layers for communications between systems. For example TCP/IP does not have a complete level 4 in the protocol stack because IP does not guarantee delivery of data nor will it detect missing packets, although there is a reassembly function in TCP/IP that serves a portion of the function typically found at level 4. Instead, for TCP/IP, reliable delivery is left up to the driving application at level 7. Thus, a keystroke stuffer is, effectively, simulation above level 7, the application layer of the protocol stack.

The second type of prior art simulators is a "protocol exerciser," which provides a somewhat more efficient method for producing load. This method involves simulation at level 7 of the protocol stack. This type of simulator will have knowledge of a particular application, for example, the File Transfer Protocol ("FTP"). This simulator will open ports directly with the system under test rather than having the client application do so and drive traffic to the system under test by conforming to the higher level protocol that is being tested, e.g., FTP, Hypertext Transfer Protocol ("HTTP"), Open Database Connectivity ("ODBC"), Simple Mail Transfer Protocol ("SMTP"), etc. The protocol exerciser provides an efficient way to generate load because all extraneous functions of the application such as redrawing screens, etc., do not need to be performed at the client. A significant drawback of this type of load generation, however, is that this simulator is protocol specific. If a new protocol is developed, a new load generator needs to be developed. For example, an SMTP traffic generator cannot be used to test the Internet Mail Access Protocol ("IMAP") even though both protocols are mail transfer protocols. Instead, it is necessary to develop an IMAP protocol tester.

The result of either of these methods is a series of packets that pass between the system under test (102 FIG. 1) and the driving system (104 FIG. 1). FIG. 3 is a layout of a packet for a Transmission Control Protocol/Internet Protocol ("TCP/IP") transmission. This packet includes a series of headers 302, 304, 306 that have been prepended to the data 308 that the application desires to send. FIG. 3 also indicates the level 310, 312, 314 in the protocol stack where the data is added to the packet and the address 316, 318, 320 that applies to each level. The application data 308 from layer 7 is typically passed to the transport layer protocol, for example, the TCP. As shown in FIG. 3, TCP adds a header 306, and passes it to next layer protocol 312, for example, the IP. IP also adds its header 304 and passes it to the layer 2 protocol 310 which also adds its header 302. As shown, layer 2 protocol may be Ethernet, Token Ring, FDDI LAN. The padded data is then passed to the physical layer where the data is converted into electrical signals and transmitted to the destination system to be received by the network interface card on the destination system. In sum, a request from a user traverses the OSI model until it is converted into network traffic. Once it reaches the destination system, it moves back up the OSI model so that a server application may interpret the request.

FIG. 4 shows the layout of the LAN header 400. This is an IEEE 802.2 Token Ring header. The shaded "Source MACID" field 402 is the client address which is added at level 2. MACIDs are assigned by the manufacturer of the network interface card, and they are unique to each card. FIG. 5 shows the layout of the IP header 500. The shaded "Source IP address" field 502 is the client address which is added at level 3. FIG. 6 shows the layout of the TCP header. The shaded "Source Port" field 602 allows the receiving host to route the data field to a specific application running on that client. The header formats shown in FIGS. 4, 5, and 6 are well known to those skilled in the art of computer networking. Note, that the port numbers are not client unique. That is, given a port number, it is not possible to identify the unique client to which that port number belongs. Instead, port numbers are used to distinguish between various users within the client. In contrast, the MACID and IP addresses are client unique. Given either a MACID or an IP address, a unique client can be determined. Given this overview, it is possible to examine the traffic flows resulting from simulators of the current art, to compare these flows with traffic that would result from an equal number of actual clients, and to compare and contrast how these flows would affect the system under test.

The major difference between a prior art simulation tool and real client traffic is the degree of fidelity of the simulation. Generally, the phrase "test fidelity" refers to a test properly exercises all code paths, for example, to closely emulate the real run-time network load in a computer network. FIG. 7 shows a series of packets 700 that would originate from a prior art simulator where a single workstation was set up to simulate 100 clients. Generally, the prior art simulation method would open one hundred sessions with the system under test. This would result in one hundred packets being sent to the system under test. However, as illustrated in FIG. 7, the client specific addresses, MACID and IP address 702a . . . 702n, 704a . . . 704n, for each of these packets would all be identical. It is apparent to both the system under test and to anyone who might be tracing the traffic of these transactions that the test setup has a single workstation providing the entire volumes of traffic.

In contrast, FIG. 8 shows one hundred packets 800 produced by a real client set. Note that each packet has unique client-specific addresses for both the MACID and the IP address 802a . . . 802n, 804a . . . 804n. Thus, to the system under test, this appears to be one hundred clients, each with one application running. An example of how this departure from fidelity by the prior art simulators would be visible and how it would negatively impact the test that could be achieved is explained below.

Typically, the prior art simulators, asserting that each driving workstation can simulate some number of client workstations, do not physically emulate multiple number of different client workstations, but only one client workstation. This can be verified by using a TCP/IP provided command. TCP/IP provides a simple command: "arp-a" which displays the Address Resolution Protocol ("ARP") table. ARP determines through the use of a broadcast message packet the MACID, a physical client address, that corresponds to a specific TCP/IP address, a protocol client address. This pair of addresses is then stored in the ARP table for future use to avoid future network traffic required for the discovery. There will be an entry in the ARP table for each workstation that communicates with a particular TCP/IP host. If this command were to be entered on the system under test, only a single entry would appear, i.e., that of the single workstation communicating with the server. In contrast, if one hundred real clients were present, the ARP table would have one hundred entries, one for each real client.

There are some cases where this distinction is not important. However, if, as an example, there were a bug in the ARP table handling code that only allowed 50 clients to be maintained, then the above test would certify this code as being good up to 100 clients while, once the code was released to customers and actually had to support 100 clients, the bug would become apparent and the code would fail. More insidiously, it would appear that the code had not been tested since the error would appear very quickly in the real environment. Thus, the example test provided by the prior art simulators provides flawed test emulation because it does not provide a realistic testing environment.

Moreover, the test is flawed because the tool used to drive the test does not provide high fidelity to the real client environment. Specifically, the prior art simulator does not exercise all the code paths of a servicing system that the real world servicing system exercises.

An additional disadvantage concerns the network traffic. In the above case, the ARP table is populated with the single entry for a driving workstation. This ARP table population requires a flow of data on the network. The result of this flow yields the ARP table entry. In a real configuration, however, there would have to be multiple flows of network information, one to each of the real clients. Thus, in the prior art simulated environment, ARP would be under represented in the network traffic flows. This would be doubly true as ARP tables have a specific size and entries tend to fall out of this table as they age. In the prior art simulated scenario, this would never occur as traffic for multiple clients is flowing to the single real workstation. In a real environment, this would happen all the time. Thus, once again, the network load simulated under the prior art simulation is different than it is in production. This, once again, leaves code paths that are either not tested at all or that are under tested in the prior art simulated environment and any flaws in these code paths can and will cause failures in production that will not show up in test.

The scenarios where the above-described failures occur can be generalized. Specifically, if the code being tested incurs any per-client costs and/or maintains state information on a per-client basis, then high fidelity testing is required if the code paths that support those per-client items are to be sufficiently tested. FIG. 9 illustrates this concept. The prior art simulators operate in area 1 902 providing a small number of clients each of which produces a high bandwidth. Real clients, on the other hand, operate in the mirror reverse. Real clients operate in area 2 904, i.e., a large number of clients each of which produces a relatively small bandwidth of data. Thus, while a simulator in the prior art provides the total aggregate bandwidth required by the system under test, the type of this bandwidth is incorrect in that it does not represent a correct number of clients. Testing which has this flaw will show the characteristic that in-lab testing will complete without error but, upon experiencing load in a production environment, the server will fail.

Generally, the above-described behavior is prominent in the services that are provided on the Internet today. Referring back to FIG. 9, if the number of clients is small, areas 1 902 and 2 904 overlap as shown at 906. Thus, either sort of test may be sufficient. However, as the total bandwidth grows, it is extremely important to ensure that the testing adjusts to the growth correctly. As an example, it is clear that if a company production level doubles in size it is unrealistic to expect that each worker suddenly doubles their workload. Instead, it is more reasonable to expect that the number of workers doubles. Thus, growth typically occurs along the "X" axis 908 of the graph in FIG. 9 rather than along the "Y" axis 910. That is, as Internet usage grows, areas 1 902 and 2 904 become increasingly distant from one another. This distance represents potential failures that cannot be detected by the existing prior art simulators.

The prior art simulators generally run on the machine types that they are simulating. i.e. if an Intel 80×86 machine is being simulated, the simulation generally runs on an 80×86 machine. If an IBM S/390 machine is being simulated, the simulator generally runs on a S/390 machine. This is true because current art simulators depend upon either the applications being run in the simulated platform and/or on the client protocol stack of the simulated platform.

Considering the foregoing, it is highly desirable to have a network simulator that is able to emulate more realistic client/server network traffic and load for testing a system under test. Particularly, it is highly desirable to have a network simulation system that is able to emulate realistically large number of clients. It is also highly desirable to have this simulation system to run on any computer system, independent of specific computer architecture.

Problems arise in simulating multiple clients from a single entity utilizing one network card because the physical LAN entities are designed for a single client, and therefore, have hardware addresses unique to each LAN card which are used for addressing and identifying the single client. Typically these hardware addresses are designated by a unique medium access control identifier ("MACID") assigned to each LAN card by its manufacturer. In network computing, the MACID identifies the specific client that originates the traffic so that the server contacted can reply and effect a two-way conversation with the client. Thus, it is also highly desirable to have a simulator be able to emulate multiple clients originating traffic while only utilizing a single physical network card. Moreover, it is highly desirable to have this simulator emulating multiple clients to also be able to emanate and absorb traffic as individual clients.

The solutions available today either simulate at a different level, commonly level 4, the session level and/or are specific to a particular protocol, e.g., web server tester, an ODBC tester, etc. These tools yield an imperfect simulation, i.e., provide a few very fast clients rather than many slower clients, and are not extensible when new protocols are developed. There exists a real distinction between system activities generated by few/fast clients and those generated by many/slow clients. Moreover, the current simulation tools invariably require "PC farms" to support the simulation. Thus, what is needed is an improved simulation tool that is able to simulate many and slow clients as well as the few and fast client workstations in order to execute a complete and thorough testing of the system or server resources that are under test.

To be robust, a simulation tool needs to be general purpose in an Intelligent Workstation Environment ("IWS"). This general purpose simulation tool must be scriptable and able to check responses. In addition, this tool must have the ability to send simulated requests. The simulation tool must also be centrally and dynamically controllable, and provide a central log of all failures with failure environment. The tool must simulate clients on the order of tens of thousands. Furthermore, the simulated clients must be indistinguishable from real clients. The tool also must be scalable with target processor size. The tool needs to be able to support multiple protocol stacks, and multiple applications per protocol stack. The tool must be able to support multiple delivery vehicles such as LAN, WAN, FDDI types. The tool also must be flexible and extensible. Presently, simulation tools of prior art are unable to support all the above requirements for a robust simulation tool. Therefore, it is highly desirable to have a simulation tool that meets the above-described criteria for a robust simulation tool.

SUMMARY OF THE INVENTION

It is an object of the present invention to provide a generalized simulation tool, which is capable of simulating multiple clients at layer 2 of the OSI model in a client/server environment.

It is a further object of the present invention to provide a basic simulation tool capable of simulating multiple clients at layer 2 of the OSI model in a client/server environment.

It is another object of the present invention to provide client/server simulation tool employing a generalized LAN frame generator for simulating situations where the serving entity is a finite state machine, and a basic LAN frame generator where the serving entity is relatively stateless.

The present invention provides a general purpose simulator tool that can be run on a central site, for example, S/390, and which is scalable with the systems under test, for example, other S/390s. The simulator of the present invention builds data frames that emulate frames from multiple clients, thus effectively simulating clients that are indistinguishable from real clients.

The simulator of the present invention is enabled to support multiple protocol stacks or suites, that is, grouping of protocols at multiple layers, including TCP/IP and IPX/SPX. Further yet, the present invention provides a simulator that supports multiple applications per protocol stack.

The present invention also provides a simulator that supports multiple delivery vehicles, thus enabling compatibility with different LAN types as well as other communication connection devices. Further yet, the present invention provides a general purpose simulator that is flexible and extensible.

According to the objects of the present invention, there is provided a simulator tool in a client/server environment for generating one or more LAN frames for enabling multiple client simulation at level 2 of the OSI model. The simulator includes an embedded protocol stack, which allows the manipulation of the simulated frames and allows the tool to respond to dynamic stack-related events in accordance with any level 2 LAN communications protocol. The simulator also includes one or more application programming interfaces ("APIs") for interaction between the various components of the tool and the protocol stack. The APIs allow the protocol stack to be replaced dynamically and/or to allow multiple simultaneous protocol stacks to be simulated dynamically. The APIs also provide for future compatibility and thus extensibility of the simulation tool with any new protocol stacks which may be implemented in the future, without having to reinvent the bulk of the tool and/or the inclusion of new protocol stacks as the market changes.

Further yet, in the present invention there is provided a scripting facility, facilitating the impression of a workload upon a system under test without the need for a human operator to laboriously enter different complexions of the workload to be impressed upon the system under test and without the need to rebuild the simulation tool with each different workload.

In the present invention, there is also provided one or more embedded protocol application modules ("PAMs") for allowing the actions of the application, e.g., web browser, to be simulated and allowing the handling of dynamic, application-related events. An API is provided between the tool and the PAM and between the PAM and the protocol stack to allow multiple applications to be simulated concurrently and to allow rapid development of new application support.

Further features and advantages of the present invention as well as the structure and operation of various embodiments of the present invention are described in detail below with reference to the accompanying drawings. In the drawings, like reference numbers indicate identical or functionally similar elements.

BRIEF DESCRIPTION OF THE DRAWINGS

Preferred embodiments of the present invention will now be described, by way of example only, with reference to the accompanying drawings in which.

DETAILED DESCRIPTION OF THE PREFERRED EMBODIMENT OF THE INVENTION

Figure 1:
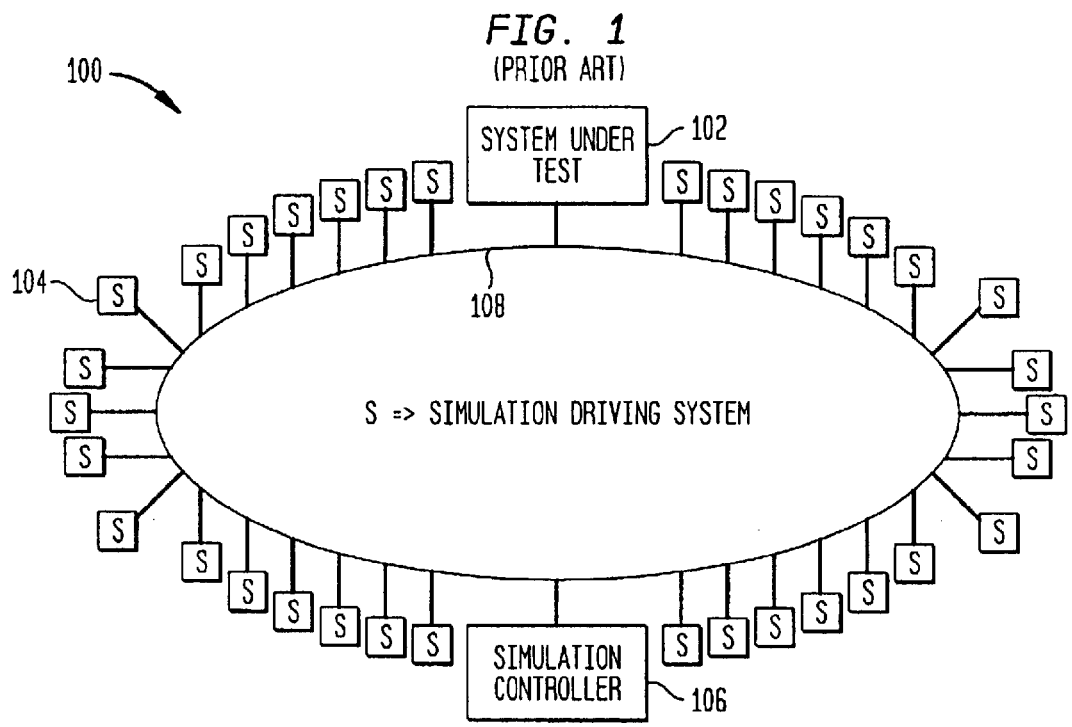
FIG. 1 is a diagram of a typical simulator in the prior art.
Figure 2:
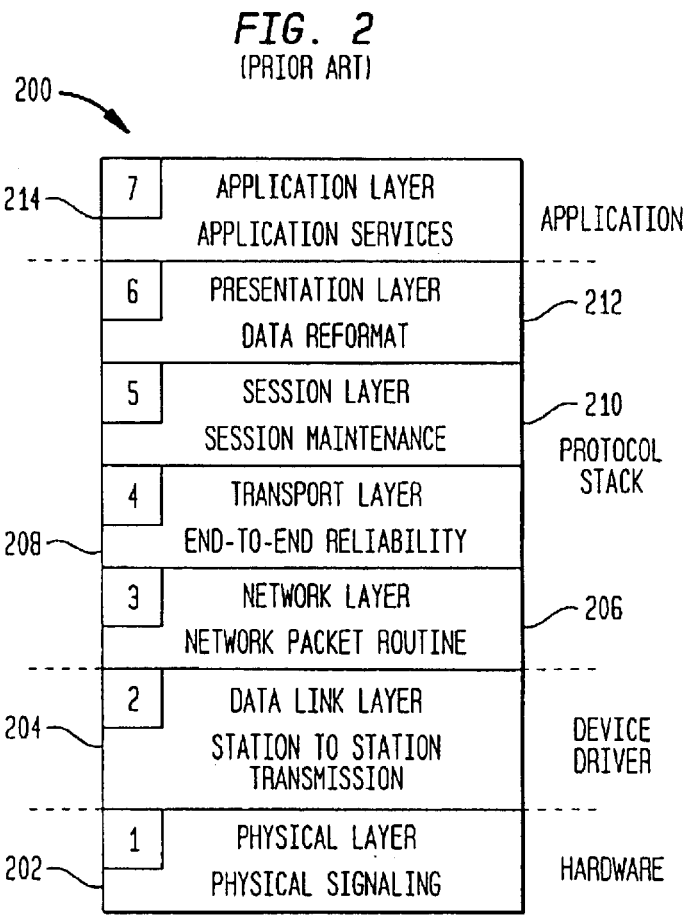
FIG. 2 is a diagram of the seven layer OSI protocol stack showing the basic functions of each layer.
Figure 3:
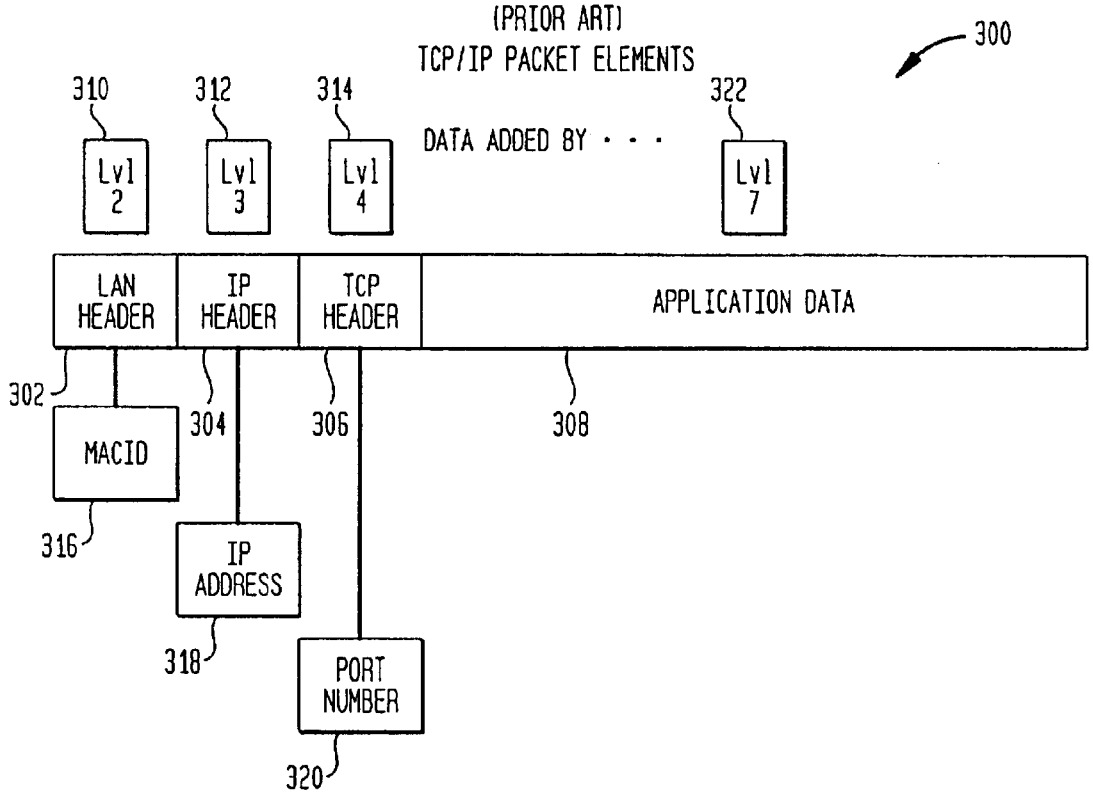
FIG. 3 is the layout of a TCP/IP packet.
Figure 4:
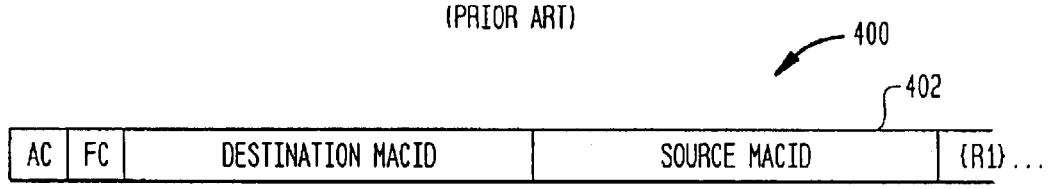
FIG. 4 shows the layout of the LAN header, 802.2 Token ring.
Figure 5:
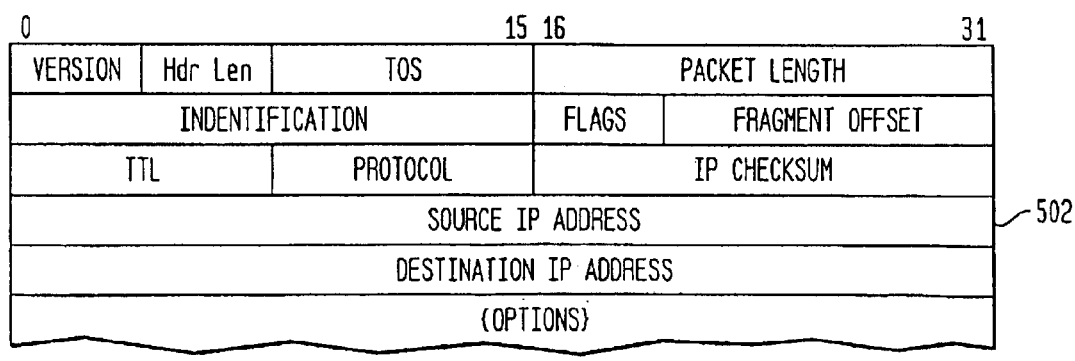
FIG. 5 shows the layout of the IP header.
Figure 6:
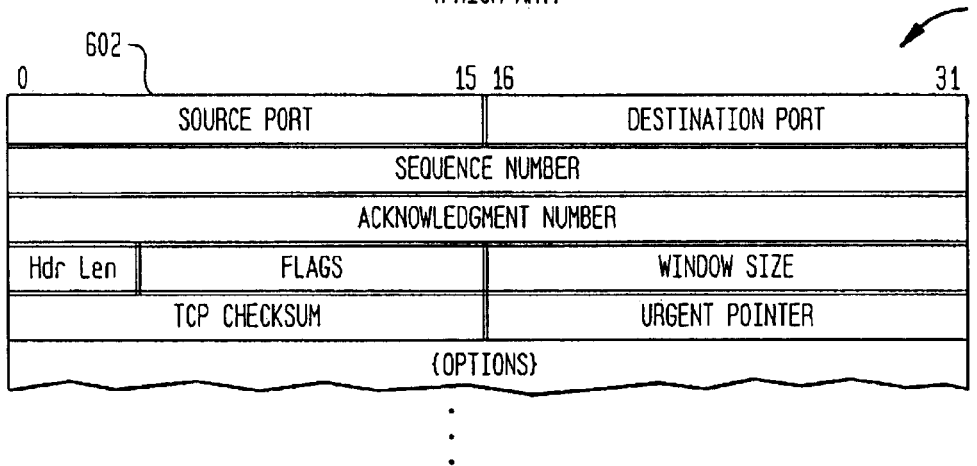
FIG. 6 shows the layout of the TCP header.
Figure 7:
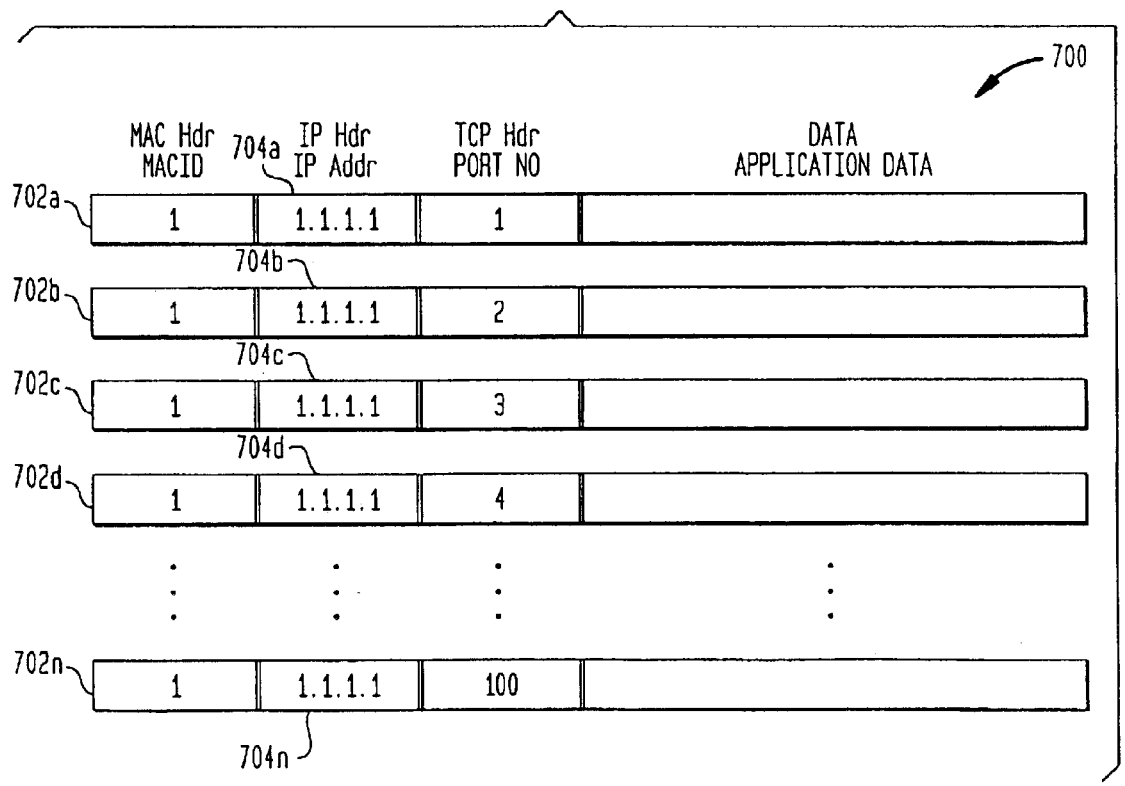
FIG. 7 shows packets from 100 simulated clients produced by a simulator of the current art.
Figure 8:
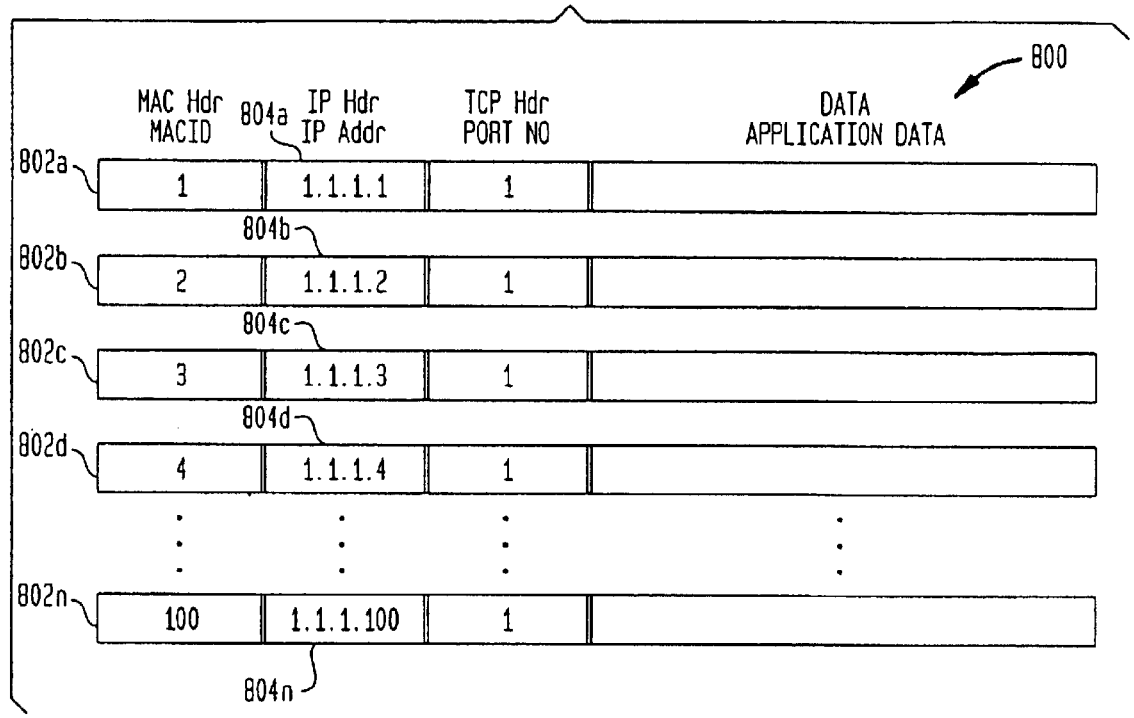
FIG. 8 shows packets from 100 real clients or from 100 clients simulated by this invention.
Figure 9:
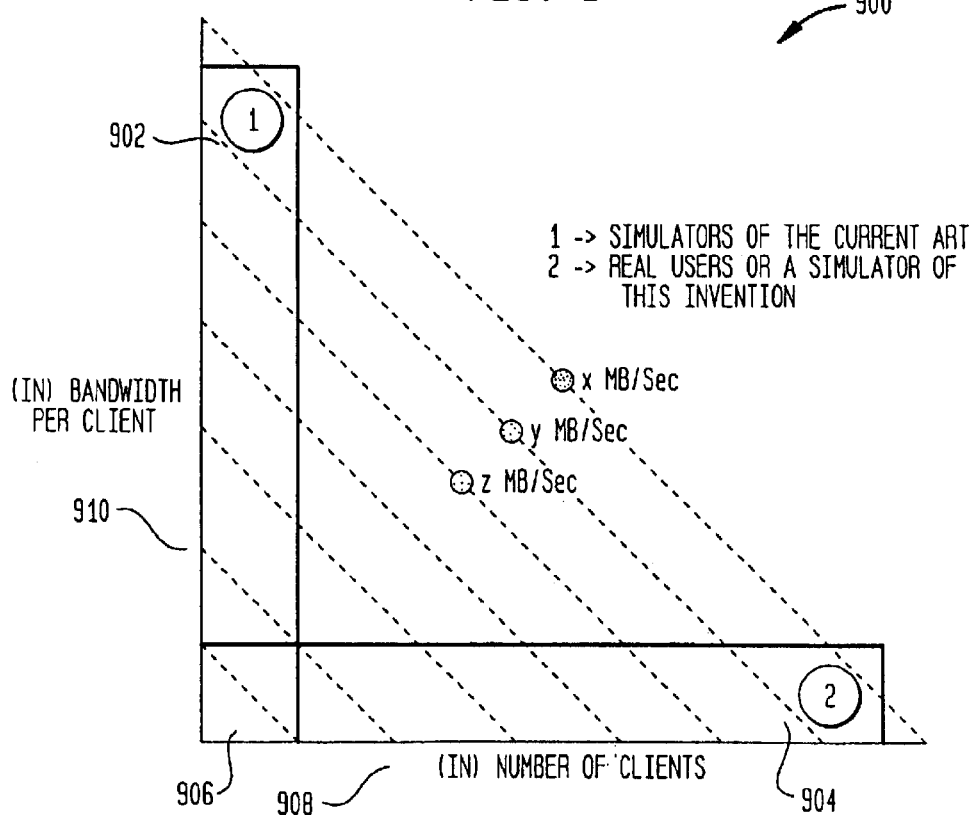
FIG. 9 shows a graph of two distinct methods of operation for reaching a desired aggregate bandwidth at the system under test.

The present invention is directed to one component of a generalized client/server network simulation tool that simulates network traffic that is indistinguishable from the traffic generated by a plurality of real clients. The simulation tool may be employed to test host-based, for example, S/390, network serving software and hardware. However, because of the generalized nature of the simulation, the scope of this tool is not limited to host testing nor to software testing. Particularly, the generalized client/server network simulation tool of the present invention may be utilized to test the network fabric, i.e., the physical layer of the protocol stack, in the manner described in commonly-owned co-pending U.S. patent application Ser. No. 09/516,708, the whole contents and disclosure of which are incorporated by reference hereto as if fully set forth herein.

According to the goals of the present invention for achieving a high level of simulation fidelity, that is, a simulation closely resembling real client network traffic paths, the network simulation tool of the present invention includes 3 components: 1) simulation at level 2 in the protocol stack; 2) simulation that builds complete LAN frames; and 3) simulation that is enabled to insert and retrieve LAN traffic for multiple clients. Each of the three components will be described briefly hereinbelow. The present invention is directed to the second component of the simulation tool, that is, simulation that builds complete LAN frames.

1) Simulation at Level 2 in the Protocol Stack

In a typical network computing environment, each client is equipped with an identifier unique to the client. This identity is unique down through level 2, the media access control or MAC layer. Specifically, each client has a unique MACID, i.e., the address that a client's LAN card recognizes in order to capture physical traffic from the LAN. To correctly simulate the real computer networking environment, the simulation tool of the present invention provides simulated clients having unique identities at level 2.

Alternatively, each client also has a unique identity at level 3, the network layer of the protocol stack. Specifically, for TCP/IP, this is the IP address for the client. Furthermore, some applications tend to receive traffic at different levels depending upon their scope. For instance, a mail server, which primarily serves users that are local to the enterprise and, thus, local to the LAN, tends to receive traffic at level 2. Each LAN frame will have an unique MACID and an unique TCP/IP address that corresponds to the MACID. Other applications, such as Web servers, primarily serve users that are foreign to the enterprise, and thus, not attached to the LAN but who have come into the LAN through a router attached to a wide area network. These servers tend to receive traffic at level 3, i.e., each LAN frame has a unique TCP/IP address that corresponds to the client but the MACID is the same in all of the frames, i.e., the MACID of the router. In the aforementioned cases, in order to provide high fidelity simulation, it is sufficient to only simulate through level 3. Further, by removing some generality from a simulator that operates at level 2, it is possible to effect a simulation at level 3.

2) Simulation Generating Complete LAN Frames

The second component is directed to a LAN frame generator for simulating multiple clients. Level 2 is where the complete LAN frame is built just prior to its transmission on the physical LAN, which is level 1. Because the client identity reaches level 2 in the protocol stack, any simulator that demonstrates a high degree of fidelity must be able to generate complete LAN frames. That is, knowledge of which specific client is being simulated must pervade the protocol stack through level 2, the building of the LAN frame.

There are two preferred embodiments for the LAN frame generator of the present invention: a first embodiment comprising a generalized LAN frame generator, and a second embodiment comprising a basic LAN frame generator.

The generalized LAN frame generator applies to testing situations where the serving entity is a finite state machine. That is, a complete transaction between the serving entity and a specific client usually takes more than one ordered communication. For example, the retrieval of an HTTP web page requires several ordered transmission/reception actions. The state of this communication must be maintained by both the client and the server if the communication is to be successful. Therefore, the generalized LAN frame generator is required to keep track of server state, so that the client can operate correctly in concert with the server.

The second preferred embodiment of the present invention is the basic LAN frame generator, which applies to testing situations where the serving system is relatively stateless. That is, each client action has one and only one response action. For example, a TCP/IP PING command sends a request and gets a response. Because of the stateless nature of the basic LAN generator, there are few cases where this simulation will be used. One notable case, however, is simple testing of transmission media where the content of the traffic is not relevant to the test or where testing for errors at the server can ignore state information.

In a stateless transaction of the second embodiment of the present invention, there is no state information associated with this transaction, but only a simple request followed by a response. In this scenario, because the client does not need to track server state information, all of the client request/response sequences are independent of each other. Because of the primitive nature of the transmissions, the programming requirements are relatively simple. In fact, the basic LAN frame generator can simply be effected by the generalized LAN frame generator. Because the simulator is not required to respond to the state of the serving entity, simple templates to generate a complete LAN frame will suffice. Moreover, the basic LAN frame generator does not require the encapsulation and queuing mechanisms that are required in the generalized LAN frame generator, as will be hereinafter described.

In fact, in order to build complete LAN frames, all that is needed are simple templates with indicators that specify what client information is to be inserted and where in the LAN frame it is to be inserted. For example, a LAN frame may be specified with information describing where the client MACID is to be inserted, where the client TCP/IP address is to be inserted, etc. Response checking from the system under test is handled in a similar way. That is, the response that is expected from the system under test is generated by the simulator and the generated response is compared to the actual response from the system under test. Moreover, because there is no conversation to maintain between the serving entity and a client, i.e., a complete transaction between the serving entity and a specific client does not take more that one ordered communication, the simulator does not have to provide any mechanisms to asynchronously id maintain the conversation. The simulator simply builds the LAN frame from the template and passes it to the data delivery mechanism. The simulator then builds the expected response, queues it awaiting the reply, and continues to service the next client. Upon receiving a reply from a client, the incoming frame is compared to the queued response frame and the result of this comparison is used to indicate success or failure of the simulation.

3) Simulation that Inserts and Retrieves Traffic for Multiple Clients

Once the LAN frames are generated as described above, the frames need to be inserted on the LAN. That is, the LAN frames built at level 2 now enters level 1 (the physical layer of the protocol stack) for transmission. Since the LAN cards generally do not check to ensure that the addresses supplied in LAN frames that are to be inserted onto the LAN are correct, it is possible to generate traffic for multiple clients and send it out. At other levels, such insertion is called "spoofing", i.e., pretending to be someone else. However, the real problem arises when the server returns traffic to the simulated client. The LAN card only recognizes traffic specifically for the client identity that has been specified to the card. Thus, in normal circumstances, traffic for multiple clients goes out but cannot come back in.

To circumvent this problem, the third component of the simulation tool employs novel methods such as described in commonly-owned, co-pending U.S. patent application Ser. No. 09/517,465, entitled INTELLIGENT WORKSTATION SIMULATION-CLIENT VIRTUALIZATION, the contents and disclosure of which are incorporated by reference as if fully set forth herein. These methods may be architecturally specific, for example, specific to token ring, or Ethernet. Moreover, they also may be generalized to cover all LAN types.

In a multi-cast architecture, a LAN card may receive traffic for multiple destinations. However, multi-cast architecture does not allow individual clients to be simulated, i.e., a multicast address represents a class of clients, and not a specific client in the class. Although there is a facility known as "virtual IP address" or VIP that allows one real client to have multiple identities, this facility functions at level 3, and therefore does not allow the full simulation fidelity that is required.

However, the above-described drawback of the multicast architecture is overcome in above-referenced commonly-owned co-pending U.S. Patent Application No. 09/517,465.

Figure 10:
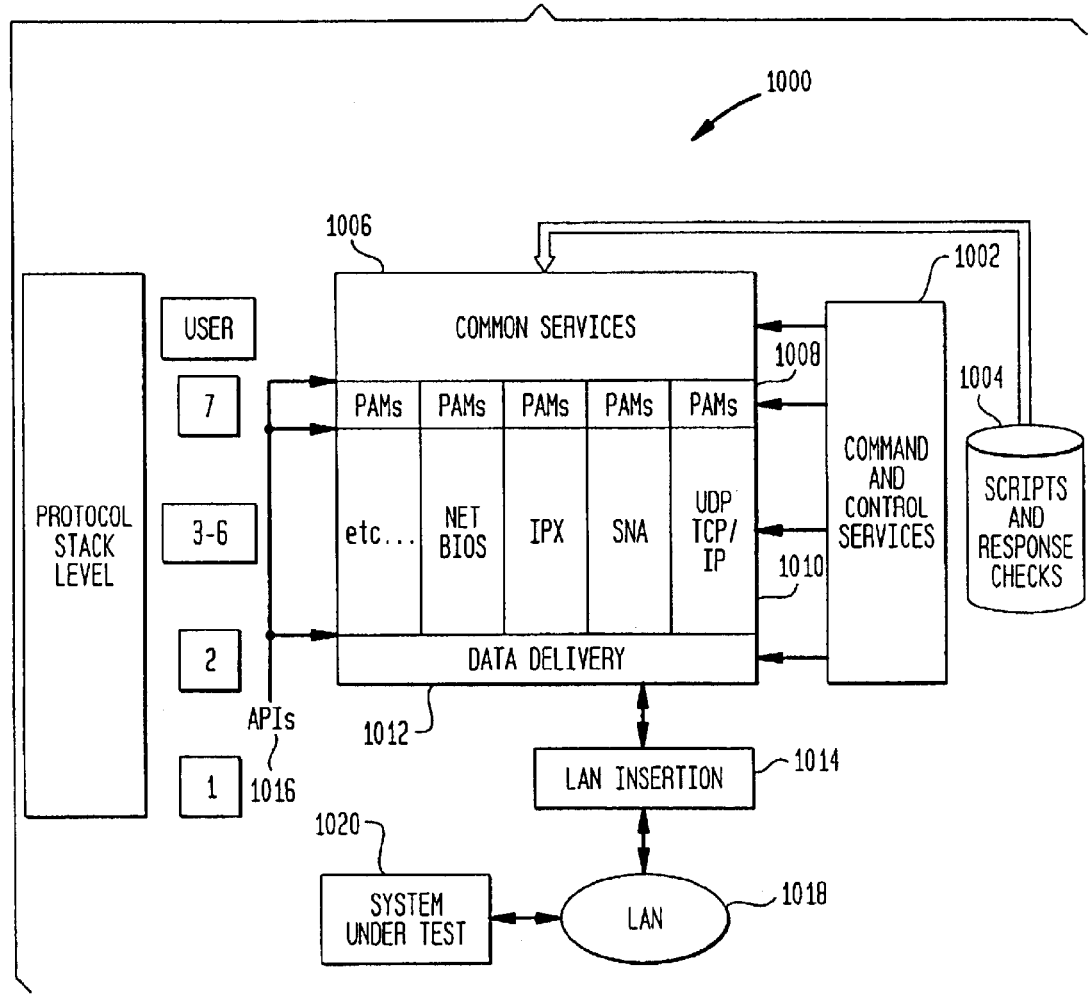
FIG. 10 is a generalized network simulator structure of the present invention.

Referring now to FIG. 10, there is provided a diagram illustrating a generalized LAN simulator structure according to the first embodiment of the present invention. Components of the simulator structure 1000 for building LAN frames at level 2, shown in FIG. 10, include: 1) command and control services 1002; 2) a script facility 1004; 3) common services 1006; 4) protocol application modules ("PAMs") 1008; 5) protocol stack(s) 1010; 6) data delivery 1012; 7) LAN insertion 1014; and 8) application programming interfaces 1016. Each of these components will be described herein.

1) Command and Control Services

Command and control services 1002 include one or more routines that provide control services for the simulator 1000. These routines include provisions for dynamically loading protocol stacks, loading and executing test scripts, defining users, defining simulation targets and collecting and reporting simulation statistics. By providing a generalized method for implementing these services, a user interface can be tailored and extended independently of the operation of the simulator. Thus, the training required for the user of the tool does not change even when the types of simulation change, providing extensibility in testing future emerging technologies.

2) Script Facility

In a simulated test environment, the script facility 1004 represents the actions of the human end-user at the client workstation. By providing a scripting facility, different complexions of a workload can be impressed upon the system under test ("SUT") 1020 without the need for human end-users, nor the need to rebuild the simulation tool. The scripting facility 1004 consists of a scripting language, a script compiler and a script executor. The scripting language is used to specify the complexion of the workload to be impressed upon the system under test including, for example, actions such as retrieving web pages, executing FTPs, and sending mail. The script is then compiled using the script compiler and then stored in a script file which comprises one or more script verbs for implementing certain actions to be taken on behalf of the simulated client. The script file is executed by the script executor effecting the impression of a load upon the system under test.

The scripting language provides the ability to control the simulation by specifying the complexion of the workload impressed upon the system under test. However, the script executor addresses commands for controlling the size of the workload impressed upon the system under test (e.g. the number of simulated clients), the simulated client think time, and total test-execution time. Particularly, the script executor is enabled to receive input specifying the number of clients to emulate and the time to wait between events.

Figure 11:
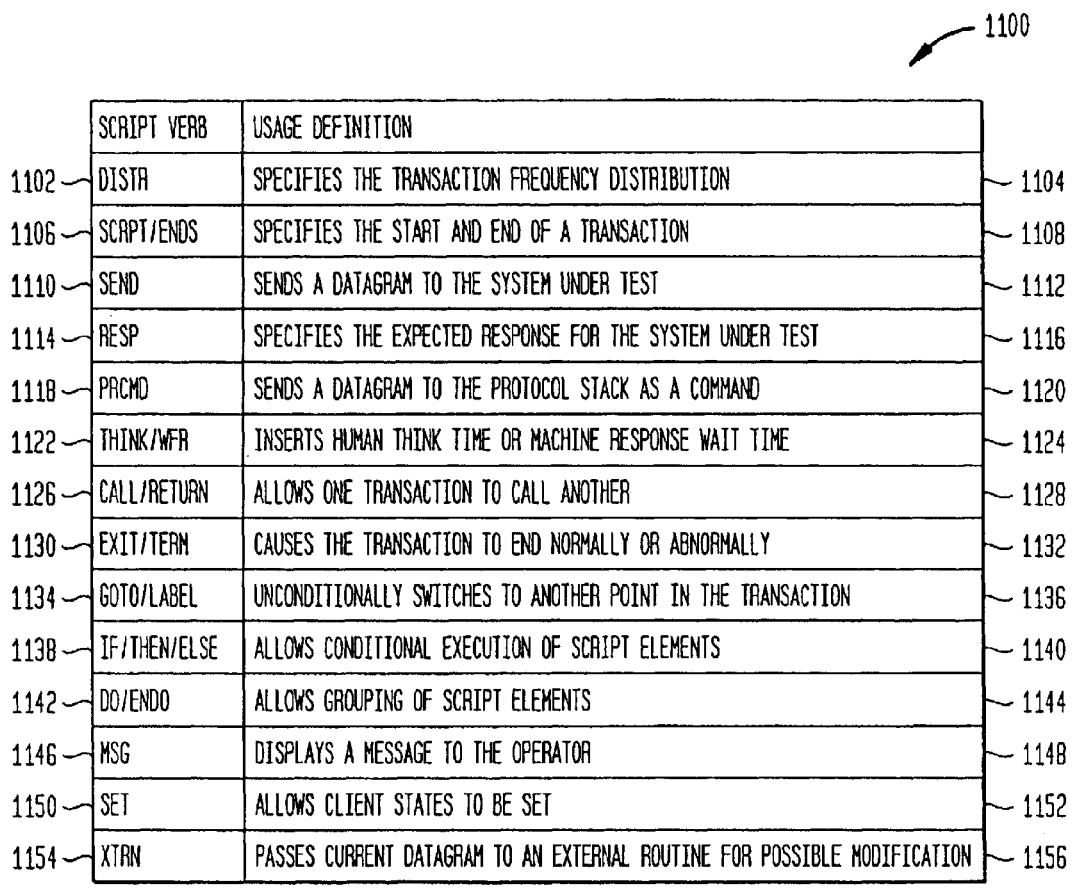
FIG. 11 is a table depicting script verbs and their respective definitions.

FIG. 11 is a table illustrating representative script verbs 1102, . . . , 1154, and their corresponding functions 1104, . . . , 1156. Script verbs specify what information is to be sent to and what responses are expected from the system under test. Furthermore, mechanisms are provided by the scripting language to capture responses from the system under test, storing them in client specific variables that can be used on subsequent transmissions. In addition to the basic send 1110 and response 1114 verbs, the scripting language addresses grouping of commands 1142 involved in the transmissions into transactions 1106, and enables specification of the relative frequency 1102 of the execution of these transactions relative to each other. For example, a mixed Web/FTP workload may specify that the ratio of Web page retrievals to FTP transactions will be twenty to one. Additionally, script verbs are provided that allow manipulation of the client state 1150, display of messages 1146 to the simulation operator, and that implement conditional logic 1138. Additional verbs may be provided as needed.

Once the aforementioned script that defines the workload upon the system under test is prepared, it is compiled by using the script compiler. After compilation is achieved, the script file is in the form suitable for execution by the script executor. Using input for specifying the number of clients to emulate, the script executor reads and executes the script. The result of the execution of a script file by the script executor is that a workload is impressed upon the system under test, which simulates the actions of the real clients. Furthermore, the impressed workload is similar to the workload impressed by like number of real clients because id the executor simulates all of the actions of a real client, i.e., simulating the actions of a human user at a client terminal.

Figure 12:
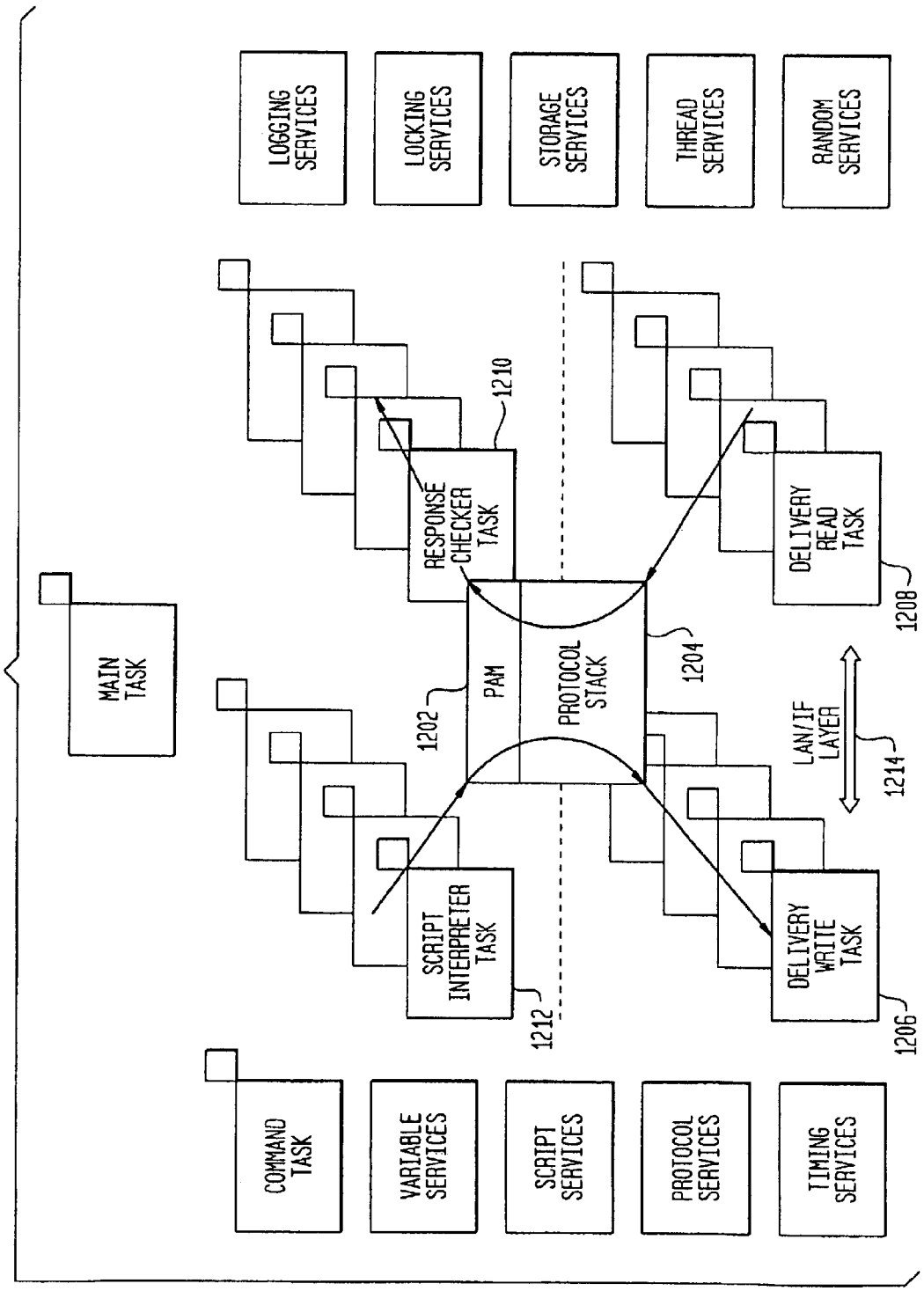
FIG. 12 illustrates a simulated application, depicted as a PAM module, receiving a request generated by the script executor and utilizing its embedded protocol stack to generate a complete LAN frame, which is then passed to a delivery mechanism to be transported on the LAN.

The simulated application 1202 is depicted in FIG. 12 as the Protocol/Application Module ("PAM"). Particularly, the script executor 1212 interprets the verbs of the script, builds a request that would result from the human actions, and passes such request to the simulated application. The simulated application 1202 operates upon the request utilizing the services of the embedded protocol stack 1204, which generates an encapsulated LAN frame. In turn, the protocol stack 1204 passes the generated LAN frame to the data delivery mechanism that employs a write task 1206 to insert a unique MACID into the LAN frame and passes the LAN frame to the LAN I/F layer 1214 for transmission over the LAN. For example, to retrieve a web page, the script 1212 generates a URL, where the simulated application 1202, a web browser, calls the protocol stack 1204 to open a socket with the system under test, then formulates an HTTP GET request for the specified URL, then sends the request to the system under test via delivery mechanism 1206, then reads the data stream from the socket (the returned web page) via delivery mechanism 1208 over the LAN I/F layer 1214 until the system under test closes the socket. The data stream retrieved by the simulated application is then returned to a response checker 1210 for verification.

As demonstrated in the abovementioned example, by employing the simulated application with an embedded id protocol stack, the simulation is accomplished with complete fidelity. The simulation assumes the context of a simulated client, that is, unique MACID and TCP/IP addresses, while executing on behalf of that client. Therefore, when these LAN frames are presented to the system under test, they are uniquely identified as having originated from one and only one client.

As mentioned, the script executor allows the number of clients to be specified and facilitates the maintenance of a separate client context for each simulated client. Thus, the system under test is unaware that each of the simulated clients is in-fact originating from a common source. As a result, the system under test is required to maintain client state information for each of the simulated clients in exactly the same way as in the real environment. Furthermore, since the present simulation is carried out at an extremely low stack level 2, the simulator is inherently flexible. That is, if a new application is developed, the simulator can drive that traffic once the simulated application is available. Additionally, if a new protocol stack or a protocol is developed, the embedded protocol stack can be updated and the new protocol supported. Contrasted with prior art, which would require the development of a completely new simulator, the present simulator is flexible and produces the high fidelity simulation required to test all code paths that would be stressed by a high client count.

Moreover, by generalizing simulation mechanisms, the present simulator is enabled to support the widest possible set of server applications running on the system under test, thereby making the generalized LAN frame generator extensible to any new application or protocol which may be developed. For example, protocols that are currently implemented include: TCP/IP, UDP/IP and SSL. As depicted in FIG. 10, other protocols, such as SNA, IPX and Netbios can also be supported. The above-mentioned extensibility is accomplished via provision of the application programming interfaces (APIs) 1016 between the LAN frame generator and the simulated application, between the simulated application and the embedded protocol stack, and between the protocol stack and the data delivery mechanism.

The generalized structure of the present simulator is required if a level 2 simulation is to be accomplished. A full protocol stack is required because of the dynamic nature of the connections between the simulated clients and the system under test. The native protocol stack of the driving system cannot be used because there is no mechanism which would allow the simulator to regain control at the bottom of the protocol stack to manipulate the LAN frame prior to its insertion onto the LAN, nor a mechanism for setting the client context that will be effective throughout the execution of the protocol stack. The native protocol stack executes only on behalf of the driving machine of the driving system and only delivers data for the driving machine. A level 2 simulation requires that the simulator be able to manipulate the LAN frames prior to their insertion onto the LAN. Similarly, once LAN frames for virtual clients are captured from the LAN, the data delivery mechanism establishes the client context prior to passing these frames to the protocol stack for eventual delivery to the simulated application. The protocol stack of the driving system only will accept traffic destined for the driving system and not for any other client. Even if multiple interfaces and multiple IP addresses per interface are allowed, the desirable client counts (e.g., in excess of 50 thousand) will not be achieved by using the protocol stack of the native system. However, the simulator of the present invention can achieve the required client count from a single machine with complete test fidelity.

3) Common Services

Referring back to FIG. 10, the common services 1006 provide the control structures to load and interpret the scripts 1004, maintain the state machines for the simulated clients, check responses to the clients, report on errors, and provide statistics for the command and control component. Because these tasks are related to the scripts 1006, this component also serves as a user interface. Separating these functions into a separate component eliminates a need to retrain operators when the tool or the marketplace changes, providing extensibility for testing future emerging technologies.

4) Protocol Application Modules ("PAMs")

As described herein, the PAMs 1008 simulate one or more running applications that generate requests for services to the server. Much of what happens to a data stream, is not the direct result of user interaction but is generated by the application running on the IWS. Since the script represents human actions such as requests and expected replies, etc., a separate component is preferred to represent the application. For example, the PAM 1008 may represent a web browser. The script 1004 in this case may then provide the uniform resource locator ("URL") desired by the user and the expected contents of the web page. The PAM 1008 is executed with the URL passed into PAM 1008 as a parameter. The PAM 1008 opens the socket with the server, sends the URL and waits for the reply or replies from the server until the socket is closed. Graphic image files present in the web page may be retrieved in parallel, as specified by the script, but the PAM 1008 manages the multiple parallel requests.

5) Protocol Stack(s)

When simulation is performed at level 2, each simulated client gets its own, unique hardware address. Therefore, the simulator needs to be able to examine and manipulate the data before it is released to the LAN. In the present invention, the simulator 1000 embeds the protocol stack 1010 by encapsulating protocol header data at each layer. Accordingly, the simulator passes the data to the embedded protocol stack for protocol encapsulation. The protocol encapsulation generally adds or pads data with appropriate header data of the protocol layers. When complete, the embedded protocol stack passes the data to the data delivery component 1012 of the simulator for hardware (MAC) encapsulation. The hardware (MAC) encapsulation includes inserting a unique hardware address associated with each client workstation being simulated. Thus, the simulation tool of the present invention manipulates the data content at both the top and the bottom of the embedded protocol stack.

Alternatively, the present invention allows the use of the "system" protocol stack but this stack needs to allow an exit at the bottom of the stack that allows the simulator to set the hardware (MAC) address. In this alternative embodiment, the simulator is typically dependent on a specific operating system and a particular release. Therefore, embedding the stack is the preferred method because the embedding allows the tool to be independent of the operating system and the system protocol stack release.

6) Data Delivery

Once the protocol stack builds a data workload for a transmission, it is necessary to build the medium access control ("MAC") layer encapsulation. Briefly, the MAC layer, a component of the data link layer in a protocol stack, provides a way to address a workstation on a same network and exchange information with it. The MAC layer interfaces directly with a particular network medium in use, e.g., Ethernet, Token Ring, etc., and passes the information to that particular network medium for transmission. The MAC layer also controls access to shared communications medium by arbitrating access with other workstations on the same medium.

In the present invention, each simulated client has its own hardware address. The data delivery component 1012 is responsible for building a MAC address for each client request encapsulated by the protocol stack and passed onto the data delivery component 1012. The data delivery component 1012 then delivers the MAC encapsulated data, a complete LAN frame, to the LAN insertion component 1014 that will insert this frame on the LAN. Corresponding functions are also provided on the inbound side where data delivery 1012 strips the MAC encapsulation and then offers the data workload to each of the protocols. If no protocol accepts the frame, it is dropped.

The data delivery 1012 also is responsible for handling Address Resolution Protocol (ARP) processing, i.e., the discovery of a hardware client address by a remote protocol stack. Portions of data delivery 1012 are specific to the particular LAN being used since hardware addresses are LAN specific.

Additionally, in the present invention, the data delivery 1012 component is implemented as a modular interface for providing different delivery methods based on the delivery method desired and used. For example, data delivery techniques including delivery to a front-end processor ("FEP"), a communication controller, for insertion into a LAN, may be employed.

Furthermore, the data delivery 1012 component may build a block of data for delivery directly to an internal protocol stack via a simulated I/O interrupt. Use of a simulated I/O interrupt and an internal protocol stack allows for an internal simulator that does not require any physical LAN hardware.

7) LAN Insertion

The LAN insertion 1014 component is responsible for inserting a completed LAN frame into the LAN 1018 which connects the simulator to the system under test 1020.

The LAN insertion 1014 component completes the simulation at level 2 of the present invention. This insertion may be accomplished in a number of different ways and is disclosed in the above-mentioned co-pending U.S. patent application Ser. No. 09/517,465, entitled "INTELLIGENT WORKSTATION SIMULATION-CLIENT VIRTUALIZATION".

8) Application Programming Interfaces

Application programming interfaces 1016 provide interfaces between the protocol stack 1010 and the other components of the simulator of present invention. Having the APIs as modular interfaces allows protocol stacks to be snapped into and out of the simulator. Thus, the simulator of the present invention may be compatible with any new protocol stack which may be introduced in the future because the APIs enable the simulator to accept data from the protocol stack. This provides extensibility to the tool without interfering with the human interfaces to the tool.

While the invention has been particularly shown and described with respect to preferred embodiments thereof, it will be understood by those skilled in the art that the foregoing and other changes in form and details may be made therein without departing from the spirit and scope of the invention.

What is claimed is:

1. A simulator of client workstations, comprising:
   at least one protocol application module for generating data streams that emulate client requests from at least one application running at the client workstations;
   at least one protocol stack component associated with the at least one protocol application module for encapsulating the data streams according to at least one protocol stack by providing the data streams with header data according to the at least one protocol stack, thereby providing encapsulated data streams; and
   a data delivery module associated with the at least one protocol stack component for inserting a unique hardware address identifier into each of the encapsulated data streams to generate network data frames for delivery to a system under test;
   wherein, each of the unique hardware address identifiers identifies an associated one of client workstations.

2. The simulator of claim 1, further comprising:
   a scripting interface module associated with the at least one protocol application module, the scripting interface module receiving emulated user actions to interpret, and passing the emulated user actions to the at least one protocol application module for use in generating the data streams thereof.

3. The simulator of claim 2, wherein the scripting interface module comprises
   at least script having instructions for emulating the emulated user actions.

4. The simulator of claim 2, wherein the scripting interface module further comprises:
   a service module that interprets the instructions for emulating the emulated user actions.

5. The simulator of claim 2, further comprising:
   a command and control service module associated with the scripting interface module for enabling dynamic loading and execution of the instructions emulating the user actions.

6. The simulator of claim 1, further comprising:
   a command and control service module associated with the at least one protocol stack component for enabling dynamic loading of the at least one more protocol stack.

7. The simulator of claim 1, the simulator further comprising:
   an application programming interface for enabling the at least one protocol stack component to communicate with the data delivery module.

8. The simulator of claim 1, further comprising:
   an application programming interface for enabling the at least one more protocol application module to communicate with the at least one protocol stack component.

9. The simulator of claim 2, the simulator further comprising:
   an application programming interface for enabling the scripting interface module to communicate with the at least one protocol application module.

10. The simulator of claim 1, wherein the at least one protocol stack associated with at least one of:
    a TCP/IP protocol;
    a UDP/IP protocol; and
    an SSL protocol.

11. The simulator in claim 1, further comprising:
    means for receiving and checking responses to the client requests from the system under test to ensure correct operation of the system under test.

12. The simulator of claim 1, further comprising:
    means for capturing and maintaining client state data from the system under test.

13. A method for simulating client workstations, comprising:
    generating data streams representing emulated client requests from at least one application running on the client workstations;
    inserting header data associated with at least one protocol stack into the data streams to generate protocol encapsulated data frames; and
    adding unique hardware address identifiers to the protocol encapsulated data frames to generate network data frames for transmission to a system under test;
    wherein each of the unique hardware address identifiers identifies an associated one of the client workstations.

14. The method of claim 13, further comprising:
    receiving user actions for initiating emulation of the emulated client requests.

15. The method of claim 13, further comprising:

dynamically loading the at least one protocol stack for generating the protocol encapsulated data frames.

16. The method of claim 13, further comprising:

receiving and checking responses associated with the emulated client requests from the system under test to ensure correct operation of the system under test.

17. The method of claim 13, the method further comprising:

capturing and maintaining client state data from the system under test.

18. The method of claim 14, further comprising:

formulating the user actions into transactions for communication to and from the system under test, wherein the data streams are generated based on the transactions.

19. A program storage device readable by machine, tangibly embodying a program of instructions executable by the machine to perform a method for simulating client workstations, the method comprising:

generating data streams representing emulated client requests from at least one application running on the client workstations;

inserting header data associated with at least one protocol stack into the data streams to generate protocol encapsulated data frames; and adding unique hardware address identifiers to the protocol encapsulated data frames to generate network data frames for transmission to a system under test:

wherein each of the unique hardware address identifiers identifies an associated one of the client workstations.

20. The program storage device as claimed in claim 19, wherein the method further comprises:

receiving user actions for initiating emulation of the emulated client requests.

21. The simulator of claim 1, wherein:

the unique hardware address identifiers comprise media access control (MAC) identifiers.

22. The simulator of claim 1, wherein:

the at least one protocol application module generates the data streams that emulate the client requests from a plurality of applications running at the client workstations.

23. The simulator of claim 22, wherein:

the at least one protocol stack component encapsulates the data streams thereof according to different protocol stacks by providing different ones of the data streams with header data according to different ones of the different protocol stacks, thereby providing the encapsulated data streams.

24. The simulator of claim 1, wherein:

the at least one protocol stack component encapsulates the data streams thereof according to different protocol stacks by providing different ones of the data streams with header data according to different ones of the different protocol stacks, thereby providing the encapsulated data streams.

25. The method of claim 13, wherein:

the unique hardware address identifiers comprise media access control (MAC) identifiers.

26. The program storage device of claim 19, wherein:

the unique hardware address identifiers comprise media access control (MAC) identifiers.

* * * * *